United States Patent
Chagam Reddy et al.

(10) Patent No.: US 10,503,587 B2
(45) Date of Patent: Dec. 10, 2019

(54) SCRUBBING DISAGGREGATED STORAGE

(71) Applicant: Intel Corporation, Santa Clara, CA (US)

(72) Inventors: Anjaneya R. Chagam Reddy, Chandler, AZ (US); Mohan J. Kumar, Aloha, OR (US); Sujoy Sen, Portland, OR (US); Tushar Gohad, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 211 days.

(21) Appl. No.: 15/639,781

(22) Filed: Jun. 30, 2017

(65) Prior Publication Data

US 2019/0004894 A1 Jan. 3, 2019

(51) Int. Cl.
*G06F 11/00* (2006.01)
*G06F 11/10* (2006.01)
*G06F 12/02* (2006.01)
*G06F 11/14* (2006.01)
*G06F 11/20* (2006.01)

(52) U.S. Cl.
CPC ........ *G06F 11/106* (2013.01); *G06F 11/1076* (2013.01); *G06F 11/1471* (2013.01); *G06F 11/2094* (2013.01); *G06F 12/0238* (2013.01)

(58) Field of Classification Search
CPC . G06F 11/106; G06F 11/1471; G06F 11/2094
See application file for complete search history.

(56) References Cited

U.S. PATENT DOCUMENTS

| | | |
|---|---|---|
| 7,246,269 B1 | 7/2007 | Hamilton |
| 7,549,089 B1 | 6/2009 | Kimmel et al. |
| 9,098,376 B2 | 8/2015 | Resch |
| 2003/0033308 A1 | 2/2003 | Patel et al. |
| 2007/0204028 A1 | 8/2007 | Lee |
| 2008/0270843 A1 | 10/2008 | Winarski et al. |
| 2009/0077003 A1* | 3/2009 | Rai ..................... G06F 11/0727 |

(Continued)

OTHER PUBLICATIONS

Shvachko et al. "The Hadoop Distributed File System." IEEE 26th Symposium on Mass Storage Systems and Technologies. May 3-7, 2010. (Year: 2010).*

(Continued)

*Primary Examiner* — Philip Guyton
(74) *Attorney, Agent, or Firm* — Schwabe, Williamson & Wyatt, P.C.

(57) ABSTRACT

Apparatuses, systems and methods are disclosed herein that generally relate to distributed network storage and filesystems, such as Ceph, Hadoop®, or other big data storage environments utilizing resources and/or storage that may be remotely located across a communication link such as a network. More particularly, disclosed are techniques for one or more machines or devices to scrub data on remote resources and/or storage without requiring all or substantially all of the remote data to be read across the communication link in order to scrub it. Some disclosed embodiments discuss having validation be relatively local to storage (s) being scrubbed, and some embodiments discuss only providing to the one or more machines scrubbing data selected results of the relatively local scrubbing over the communication link.

20 Claims, 4 Drawing Sheets

(56) References Cited

U.S. PATENT DOCUMENTS

| | | | |
|---|---|---|---|
| 2011/0029836 A1 | 2/2011 | Dhuse et al. | |
| 2013/0282668 A1* | 10/2013 | Hsieh | G06F 16/215 707/691 |
| 2014/0280681 A1 | 9/2014 | Resch | |
| 2014/0281702 A1* | 9/2014 | Venkata | G06F 11/1402 714/15 |
| 2016/0266801 A1* | 9/2016 | Marcelin Jemenez | G06F 3/0604 |
| 2017/0133106 A1 | 5/2017 | Viswanathan Pillai et al. | |
| 2017/0177249 A1 | 6/2017 | Kurilov et al. | |
| 2018/0032462 A1* | 2/2018 | Olarig | G06F 13/4022 |

OTHER PUBLICATIONS

Cloudera Engineering Blog. "HDFS DataNode Scanners and Disk Checker Explained." retrieved from "https://blog.cloudera.com/blog/2016/12/hdfs-datanode-scanners-and-disk-checker-explained/" (Year: 2016).*

Non-Final Office Action dated Dec. 18, 2018 for U.S. Appl. No. 15/640,229, 19 pages.

U.S. Appl. No. 15/640,229, entitled "Drive-Based Storage Scrubbing," filed Jun. 30, 2017.

Welcome to Apache.™ Hadoop®! (n.d.). Retrieved Oct. 18, 2017, from URL <<http://hadoop.apache.org/>>.

Homepage. (n.d.). Retrieved Oct. 18, 2017, from URL<<http://ceph.com/>>.

RDMA Consortium (2009). Retrieved Oct. 27, 2017, from URL<<<http://www.rdmaconsortium.org/>>.

Open Fabrics (2014-2017) Retrieved Oct. 27, 2017, from URL <<https://www.openfabrics.org/>>.

* cited by examiner

SCRUBBING DISAGGREGATED STORAGE

TECHNICAL FIELD

The present disclosure relates to big data hosts using storage remotely located over a network, and more particularly, to a host validating data stored on remote storage without the host having to access over the network all of the data to be validated.

BACKGROUND AND DESCRIPTION OF RELATED ART

Big Data is Big Business. With the incredible number of devices being interconnected all of these interactions generate enormous amounts of data that needs to be stored—somewhere. And this does not include the enormous amount of data created by device users, shoppers, consumers, producers, etc. all of which also needs to be stored, again—somewhere. But beyond simple storage, there is also demand for security, redundancy, fast access, and reliability to stored data. There are many options for implementing a "back end" and two well-known free and hence popular implementations are based on Ceph and Apache Hadoop technology. These two platforms will be used as exemplary environments in which various aspects of inventive concepts disclosed in the detailed description may be practiced. It is assumed the reader is familiar with implementing both Ceph and Hadoop®®, see for example Internet Uniform Resource Locators (URLs) ceph.com and Hadoop®.apache.org, and that the reader understands how data is stored, distributed, and validated for correctness.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
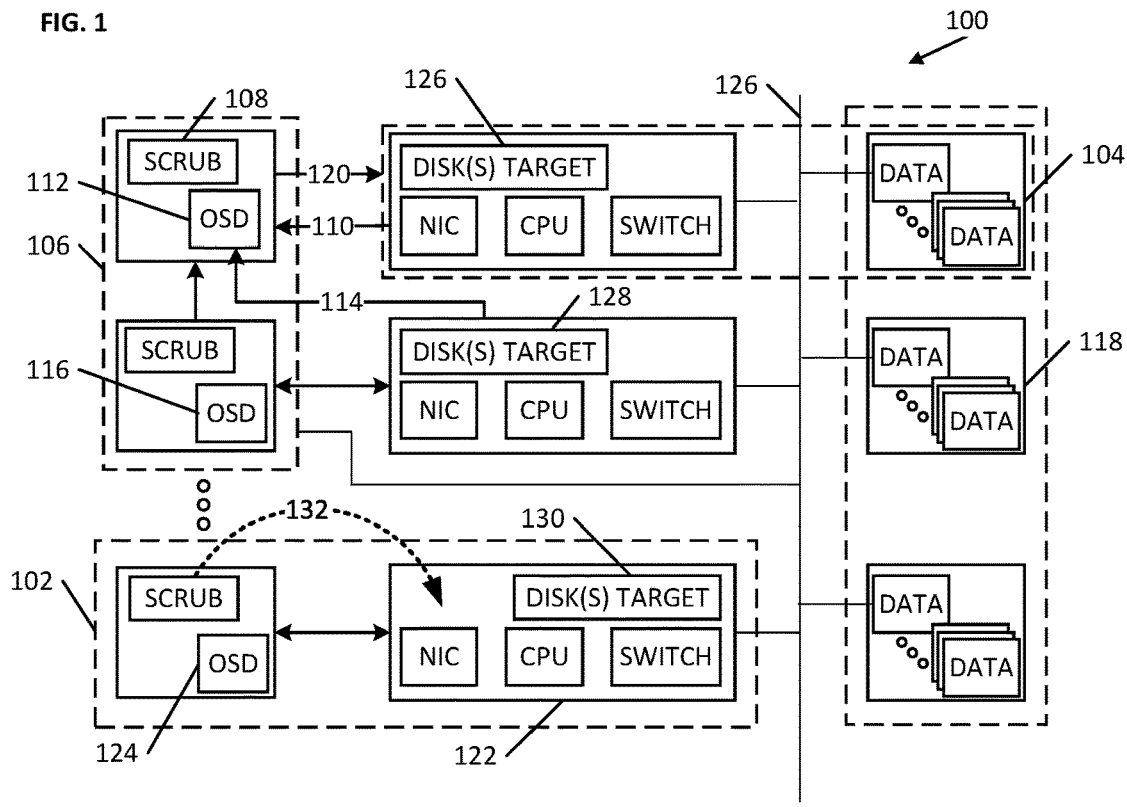
FIG. 1 illustrates an exemplary data storage environment modeled after a typical Ceph installation.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations do not have to be performed in the order of presentation. Operations described may be performed in a different order than the described embodiment. Various additional operations may be performed and/or described operations may be omitted in additional embodiments. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are considered synonymous.

As used herein, the term "circuitry" or "circuit" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, processor, microprocessor, programmable gate array (PGA), field programmable gate array (FPGA), digital signal processor (DSP) and/or other suitable components that provide the described functionality. Note while this disclosure may refer to a processor in the singular, this is for expository convenience only, and one skilled in the art will appreciate multiple processors, processors with multiple cores, virtual processors, etc., may be employed to perform the disclosed embodiments.

FIG. 1 illustrates an exemplary data storage environment 100 based in part on a typical Ceph installation. Briefly, Ceph is an open source distributed storage software platform designed to operate on standard server platforms 102 (a node), e.g., Intel® based servers, to provide resilient block, object and file storage access. The dashed box identifies node 102 as a particular grouping of devices that are co-located and some or all of which may be disposed within a single device, enclosure, rack, etc. And while only one node 102 is called out in the illustration, this is for clarity in presentation. There typically are multiple such nodes, and in the illustration there are at least three such nodes illustrated with ellipses representing more nodes that may be present that are not illustrated. Ceph provides fault tolerance by breaking data 104 into "objects" and distributing the objects across a cluster 106. Ceph ensures data integrity by routinely scrubbing data with a scrub 108 process, finding object corruptions, reporting 110 errors to a Ceph Object Storage Daemon (OSD) 112 responsible for the affected data 104, and automatically fixing the corrupted objects by getting 114 corrected replica data from a redundant OSD 116 data 118 and updating 120 the corrupted data.

Ceph deployments begin with setting up Ceph Nodes 102 which include a grouping 122 of target disks, processor, scrub process, etc., and an OSD 124 responsible for the machine 122 disk(s). Nodes may be interconnected by way of a network 126 and a Ceph Storage Cluster, e.g., cluster 106. In one example, the Ceph Storage Cluster requires at least one Ceph Monitor (not all referenced components are illustrated) and at least one Ceph Object Storage Daemon (OSD) 112. It will be appreciated that in various embodiments there can be other OSDs, e.g., 116. There can also be a Ceph Metadata Server for running Ceph Filesystem clients. The Ceph OSDs stores data, handle data replication, recovery, backfilling, and rebalancing. The Ceph Monitor, among other things, tracks maps indicating cluster state (e.g., monitor map, OSD map, Placement Group (PG) map, and CRUSH map). The Ceph Metadata Server (MDS) stores metadata on behalf of the Ceph Filesystem (i.e., Ceph Block Devices and Ceph Object Storage do not use MDS). Ceph provides for automated scrubbing, a background operation in Ceph for maintaining data integrity as well as resiliency against drive data corruptions. It will be appreciated Nodes and/or Clusters may be interconnected by way of a network 126 or other communicative coupling.

When Ceph is provisioned using disaggregated storage targets, e.g., disk(s) target(s) 126, 128, 130 with Nonvolatile Memory Express over Fabrics (NVMe-oF) targets, the scrub 108 process overhead increases since each remote disk's data will be read over the network in order to allow its managing OSD to validate the stored objects. This overhead is multiplied by each remote target that needs to be validated. During scrubbing an OSD checks metadata related to stored objects to detect corruption. In one embodiment, the Ceph OSD reads all the objects and metadata (a disk Input/Output (IO) intensive task), calculates a type of checksum on the data (e.g., a compute intensive task such as crc32c), and compares validation data across replicas. For example, in the illustrated embodiment, reported 110 results may be compared with CRC data obtained of replicated data in other targets 128, 130. This testing detects missing objects, bitrot, failing disks, or other events causing object corruptions. The OSD that detects the error is responsible for updating its corrupted copy by obtaining 114, a correct copy. Unless a drive is failing, typically there are few errors so data transfers related to correcting errors in disaggregated storage tends to be a small percentage of overall data stored.

It will be appreciated after a certain number of errors, embodiments may elect to take storage offline and replace it. And as will be discussed further with respect to FIG. 3, in one embodiment the overhead of reading all or substantially all of the disk target data over a network can be largely eliminated by moving 132 the scanner to scrub storage to be local to the targets, e.g., collocated with the data 104, 118, etc. and allow for only errors to be sent across the network for verification and correction.

Figure 2:
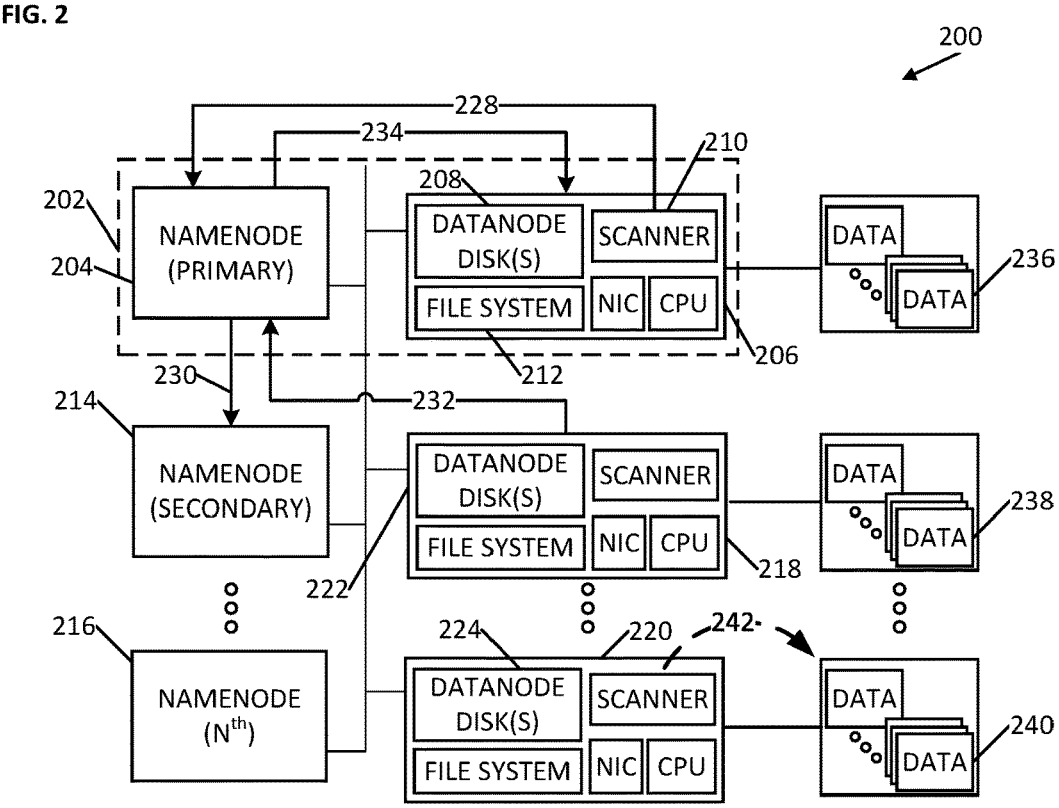
FIG. 2 illustrates an exemplary data storage environment modeled after a typical Hadoop® installation.

FIG. 2 illustrates an exemplary data storage environment 200 based in part on a typical Hadoop® installation. The Hadoop® framework provides a Hadoop® Distributed File System (HDFS) as shared file system also designed to operate on a large number of standard server platforms 202, e.g., Intel® based servers that do not share memory or storage. As illustrated a primary NameNode 204 and DataNode machine 206 (illustrated are a machine including the DataNode Disk(s) 208, scanner 210, native filesystem 212, etc.) The HDFS permits storage and access of large data sets across all nodes 204, 214, 216 in a Hadoop® cluster. HDFS separates large volumes of data into data blocks that are managed from various interfaces in the cluster. Data blocks are redundantly stored in multiple hardware locations 206, 218, 220. The HDFS is a filesystem that sits on top of a host computer's native file system, e.g., file system 212, allowing Hadoop® to operate on top of many different operating systems. Hadoop® implements massively parallelizable job executions in a cluster such as the MapReduce job (e.g., using the YARN, Pig, Hive, Flume, etc. architectures) which implements a Map job to sort and filter a data set into a form suitable for analysis, and a Reduce job that processes Map output and summarizes it, e.g., performing operations on the database to identify desired data. Hadoop® tracks where data resides, including copies for redundancy.

Individual servers index their data and index data is provided to the MapReduce task which then reduces information from servers into a unified data set. The scanner 210 provides background scrubbing of Hadoop® data, where each Hadoop® node 204, 214, 216 actively scans all HDFS partitions in their DataNodes 208, 222, 224 for corruption. If corrupted data is found by a scanner 210, e.g., in DataNode 206, the location reports 228 the error to its Primary Node, e.g., node 204. The Primary Node, as in understood by one skilled in the art, identifies a backup Secondary Node 214 from which it can request 230 corrected data, which the Secondary Node provides 232 the corrected data and the Primary Node can update 234 the corrupted data. A server may track multiple data volumes and hence have multiple scanning operations running concurrently. When Hadoop® is provisioned using disaggregated storage targets, e.g., when the DataNodes 208, 222, 224 use storage such as Nonvolatile Memory Express over Fabrics (NVMe-oF) targets, the scanner process, e.g., scanner 210, overhead increases since each target will be read over the network in order to allow its data to be validated.

As will be discussed further with respect to FIG. 4, in one embodiment the overhead of reading all or substantially all of a DataNode's disaggregated data over a network can be minimized by moving 242 the scanner to be local to the data, e.g., 236, 238, 240, etc., and require only errors and control to be sent across the network for verification and correction.

Figure 3:
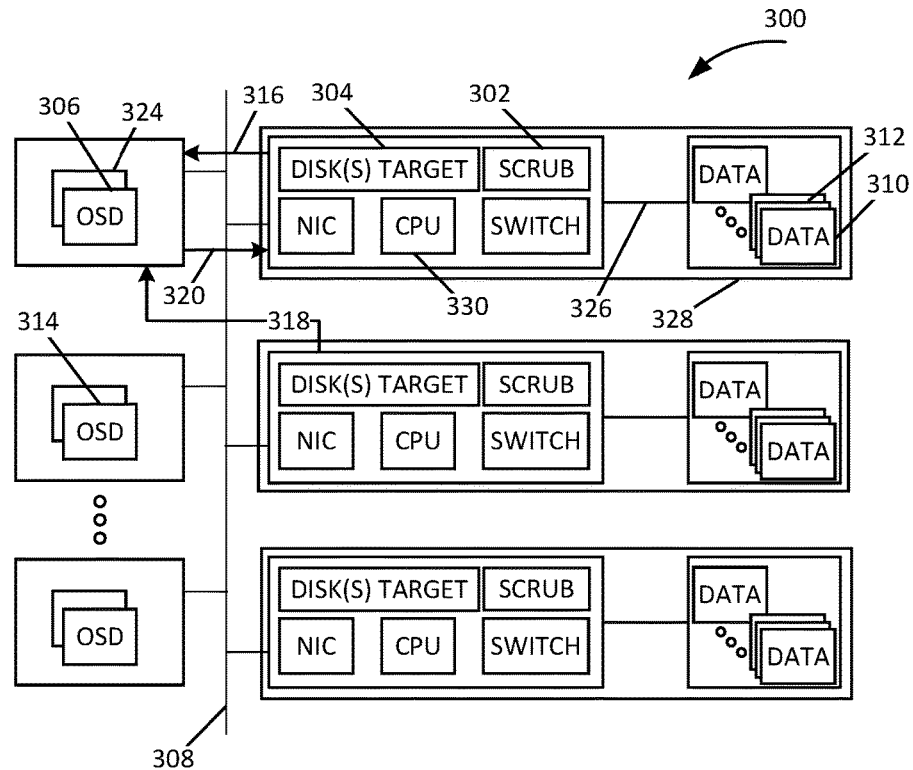
FIG. 3 illustrates an exemplary data storage environment modeled after a typical Ceph installation but providing improved data scrubbing.

FIG. 3 illustrates, one embodiment 300 of a variation to the FIG. 1 embodiment in which the FIG. 1 scrub 108 task moved to a scrub 302 task co-located with the disk(s) target 304 accessible by an OSD 306 over a network 308. As discussed above, the scrub process may be running, for example, on or in conjunction with a NVMe-oF target that mounts a read only (to prevent damage to the file system) OSD partition on a disk target 304 to scan all objects (e.g., in stored data 310) for corruption.

In the illustrated embodiment, the scrub task is designed so as to avoid crashing if it reads stale data. It will be appreciated that for efficiency, the validation of data will occur as a background task operating asynchronously to other reading and/or writing activity occurring on a target. It will be appreciated there can be a lag time between writing to a target, and saving metadata 312 related to the data, e.g., validation data such as a CRC and/or other information about the date being written to a target. Therefore validation techniques need to be robust. For example, in a simple case, when a OSD 306 is updating data 310 stored at a target 304, depending on when a scrub task accesses the data, it's possible the underlying data 310 related to the metadata 312 has been updated or even deleted since the metadata was created. Conversely in a lag time period there may be changes made to metadata 312 that leaves the data and metadata out of sync. Therefore the scrub task must be resilient and handle such "stale data" situations, and simply report out a potential problem (e.g., it may be a false positive) to the managing OSD 306 and the OSD can then access the data over the network 308, and if needed, compare with redundant data managed by a different OSD 314, to confirm the actual status of a potential data corruption problem.

The scrub 302 task may be configured in a variety of ways to process potential data corruption issues. For example, if a storage media is considered extremely reliable and the likelihood of failure is remote, a scrub task could be configured to process each error as they are discovered. In another embodiment, errors may be accumulated, either until a certain number of them are collected, or until an entire drive is scanned. It will be appreciated that in addition to a predicted rate of errors, the speed at which updates occur to may also play a factor in how often an OSD and/or scrub task will process potential corruption. If, for example, data is changing very rapidly it might be impractical to wait very long to avoid cascading errors when corrupted data is relied on and creates more corruption.

Once a scrub 302 task builds a list of objects (data) that may be corrupted for a given target 304 disk, in one embodiment a list is maintained that cross-references which OSD is responsible for a given drive. The scrub task will identify the managing OSD, e.g., item 306, responsible for handling potential data errors, and send 316 a message identifying the error(s) found. Since the illustrated embodiment is based on a CEPH type of installation, in one embodiment the scrub task may be enhanced to send a new CEPH_MSG_PG_SCRUB message with message content identifying Placement Groups (PGs) and related objects (data) that have been identified as potentially corrupted. As noted, since the disks may be in rapid constant use, in one embodiment the message payload is kept small to minimize overhead in reviewing potential corruption.

After sending 316 the message, in the illustrated embodiment, the appropriate Ceph OSD 306 process may recalculate the validation for the potentially corrupt data, e.g., data 310 to confirm whether it is actually corrupted. Since initial determination of potential corruption may be performed on live data, which as discussed above happens when data is both being used and simultaneously being evaluated for corruption, by checking meta data such as a CRC or other validation data, there could be false positives or false negatives. A false positive can occur when between identifying a potential error and reporting it to the managing OSD, the data is deleted. When this happens, the managing OSD will not be able to locate the data it has been requested to correct, and hence the reported error should be ignored. In one embodiment, in order to address a false positive, the managing OSD will do one more check by using local locking semantics for the appropriate Placement group. If the object is found corrupted, then the actual data flow that fixes the object will be executed. Otherwise the managing OSD may silently ignore the potential error as a false positive. Ignoring such errors is atypical to storage environments such as Ceph since typically the error checking is performed with data locks placed on data to freeze it for inspection and unexpected data disappearances can trigger a crash or other program exception. A false negative can occur when the initial data validation occurred in the lag time between disk update and validation meta data updating, e.g., validation data may have been updated but the actual data corresponding to it has not yet been committed to disk, so it appears there may be a data error but by the time the managing OSD is asked to confirm the error, the data is written out and there's no corruption issue.

In either case the scrub 302 task reviewing data, and/or the managing OSD 306, should be aware of the possibility of false negative or false positive results and accommodate them. In the current illustrated embodiment the managing OSD, e.g., item 306, may re-compute the validation data as discussed above, and if corruption is detected, then it may receive 318 a corrected copy from another OSD 314 managing a replica, or if available, the OSD 306 may fix corrupted objects by rebuilding the data using erasure coded pool parity chunks. It will be appreciated by one skilled in the art that in lieu of or in addition to secondary managing OSDs replicating data, the managing OSD may utilize erasure coded pools that store data chunks in a manner akin to RAID storage with disk drives, where there can be a failure of some number of data centers and yet suffer no data loss with appropriate distribution of data and parity information and/or verification meta data allowing the reconstruction of lost data. Once the corrupted data has been obtained by reconstruction, or as illustrated as received 318 from another OSD's data, the corrupted data, e.g., a corrupted Ceph object, can be replaced 320.

It will be appreciated that by moving the scrub 302 processes to be located near to the disk(s) target 304, even with occasional false results being read over the network 308 by an OSD 306 seeking to confirm the corruption, the amount of data needing to be read over the network may be substantially less than reading all of the target data over the network. Also note that even though the scrub 302 task is illustrated as disposed separate from data 310 and communicatively coupled by a link 326, which could occur in a server room environment, it will be appreciated they may be disposed within an enclosure/machine 328. It will be further appreciated while in the illustrated embodiment one Ceph Object Storage Daemon (OSD) has been discussed as managing one disk target, it will be appreciated multiple OSDs, e.g., items 306, 324, may be co-located within a single machine or host environment, and that multiple drives may be represented by disk(s) target 304. Input/Output (IO) requests may come from a variety of different clients, such as a guest VM, container, or local scrub task such as from a scrubbing thread pool. It will be appreciated by one skilled in implementing Ceph and Hadoop® and other massive-scale distributed storage (also referred to as "cloud storage") these storage environments may require modification to support two-phase resilient data scrubbing.

Figure 4:
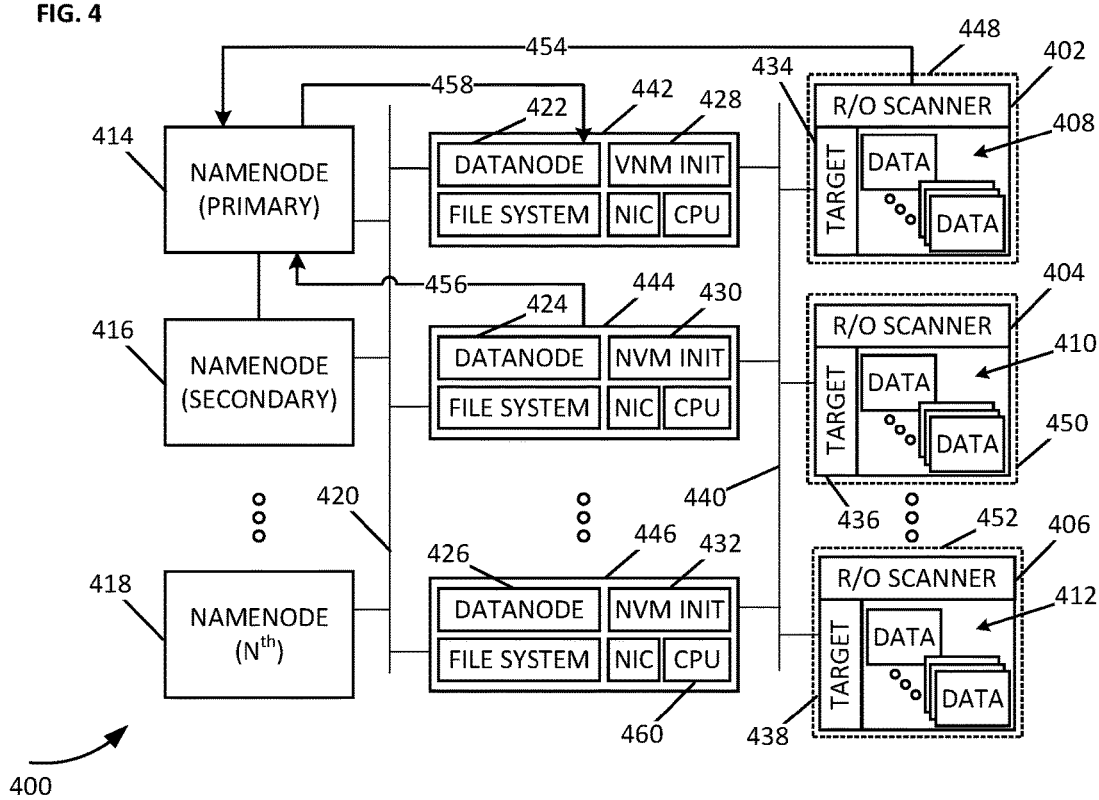
FIG. 4 illustrates an exemplary data storage environment modeled after a typical Hadoop® installation but providing improved data scrubbing

FIG. 4 illustrates, one embodiment 400 of a variation to the FIG. 2 embodiment in which the FIG. 2 scanner 210 task is moved to a scanner 402, 404, 406 task co-located with the disk(s) storing data 408, 410, 412 accessible by a Hadoop® NameNode 414, 416, 418, over a network 420. It will be appreciated by one skilled in the art NameNodes (sometimes referred to as Master nodes) track metadata corresponding to data stored in the Hadoop® File System (HDFS). DataNodes 422, 424, 426 (sometimes referred to as Slave nodes) actually store the data in the HDFS. NameNodes and DataNodes are in regular communication and if a DataNode fails, data is not lost as the NameNode will arrange for replicated data. NameNodes hold metadata for stored blocks as well as block to file mappings. DataNodes tell NameNodes what blocks they have on their HDFS startup, and for safety, data is stored with a number of identical replicas, e.g., original plus typically at least two copies. In the illustrated embodiment ellipses indicate there may be more NameNode/DataNode/Data combinations than the three displayed and discussed for exemplary purposes.

In the illustrated embodiment it will be appreciated background scrubbing will occur to proactively scan DataNode HDFS partitions for corrupted blocks (e.g., corruption in data 408, 410, 412). There can be many reasons for data corruption in any data storage environment, e.g., Ceph, Hadoop®, etc., including network transmission errors while data is moving across the network 420, drive failure (or failing), drive surface errors, media End-of-Life, power outage during a write operation, equipment failure, etc. To assist with detecting data errors, Hadoop® generates validation data (in metadata associated with the data) when data is stored in the HDFS. Datanodes storing the data are required to compare a generated validation data against the initial validation data created when the data is initially created. This helps ensure replicating datanodes only store correct data that may have been corrupted during network transmission to the datanode. When a client requests data from the HDFS the client may compute its own copy of validation data based on data received from the HDFS and compare it to the validation data provided by the HDS for the data. This helps ensure proper receipt of requested data. Validation data includes a checksum performed on the data, but it will be appreciated this checksum and/or other data may be utilized for tracking health of stored data. Validation data is usually checked when data is read from the HDFS, as well as through periodic scans such as by the scanner 402 task.

In the illustrated embodiment, unlike a more traditional DataNode configuration such as that in FIG. 2, where the disk(s) are local to the DataNode, in this embodiment, the HDFS DataNodes 422, 424, 426 uses data directory which is mounted using a NVMe-oF initiator (NVM Init) 428, 430, 432 that points to the logical volume or physical drive managed by a NVMe-oF target 434, 436, 438. As illustrated the DataNodes/NVMe-oF initiators and NVMe-oF targets/data are distributed across a network 440, which it will be appreciated may be the same network as network 420. While this distributed initiator/target system provides broad control over how datacenter may be configured and managed, one effect similar to that as discussed above for Ceph, is that data scrubbing operations performed by a DataNode on its data will be transported over the network. Since as noted above the DataBlockScanner will attempt to validate an entire disk, this will result in a significant network load as well as increased client IO requirements, drive IO bandwidth requirements on a target system 448 encompassing the Target 434 and disk(s) storing the data 408, as well as on the system including the DataNode 422 and NVM Init 428. It will be appreciated the other Targets 436, 438 and Data 410, 412 may also be implemented as target systems 450, 452.

To alleviate some burdens in the illustrated distributed system, Hadoop® may be configured to move the scrubbing task, e.g., FIG. 2 scanner 210 task, and be aware of the NVMe-oF disaggregated storage configuration so that it may be more efficiently utilized. As discussed with Ceph, validation scanning IO and computation overhead for validating all data, e.g., in data 408, may be contained within the IO isolated to the appropriate NVMe-oF target node, e.g., target systems 448, 450, 452. In one embodiment, only corrupted objects will require network bandwidth to transfer them to a NameNode for verification and if needed correction from another DataNode. It will be appreciated the illustrated configuration also allows for throttling the local drive scrubbing and facilitate balancing client IO being serviced by a Target 434, 436, 438.

If data errors are found, for example in DataNode 422, similar with the Ceph example above, Hadoop® attempts to fix errors using non corrupted replica blocks from other DataNodes, e.g., 424, 426. It will be understood by one skilled in the art a Hadoop® scanner, e.g., 402, 404, 406, is responsible for background scrubbing on DataNode. In the illustrated embodiment the Hadoop® DataBlockScanner task is used to regularly inspect all data blocks stored in a DataNode's 422, 424, 426 disks to validate its stored data 408, 410, 412. The DataBlockScanner may use the VolumeScanner, a task that scans a single volume. There may be multiple VolumeScanner tasks operating to look at a DataNode's data, each with its own execution thread, with all of the VolumeScanners associated with a DataNode being managed by the DataNode. In one embodiment the validation data includes a MD5 checksum that is compared by the VolumeScanner against data, e.g., data 408, and the VolumeScanner creates a list of all potentially corrupt data blocks. These potentially corrupt data blocks are reported to the appropriate NameNode which is responsible with fixing them.

Thus, for example, a Target 434 may employ a read-only (R/O) Scanner 402 that as discussed above is used to scan Data 408 associated with the Target, e.g., in a disk or disks of the Target. The Scanner computes validation data, e.g., MD5 hash and/or other validation data and compares against the validation data stored with the block in the HDFS, and as discussed above reports 454 bad blocks to an appropriate NameNode 414. The NameNode may then receive 456 an uncorrupted copy of the corrupted block from a DataNode 424 storing a replica of the corrupted block. It will be appreciated any replicating DataNode may be used. The received 456 copy may then be used to update 458 the appropriate DataNode 422 managing the Scanner 402 that reported corruption in a data 408 partition of the DataNode 422. By minimizing network traffic for error checking, benefits of disaggregation may be obtained without having to transport all of what may be enormous amounts of data over a network to validate it. It will be appreciated benefits scale with larger data sets, e.g., petabytes, exabytes, etc. as the percentage of errors become increasingly small to overall data stored. In the illustrated embodiment, Scanners 402, 404, 406 are assumed to be mounting HDFS data partitions on a (NVMe-oF) Target as a read only file system without file system journaling to avoid flushes. It will be appreciated the read only mount option on the Target helps avoid accidentally flushing dirty filesystem data, such as inode data (or other data depending on the underlying filesystem), which one skilled in the art understands would likely corrupt an entire HDFS partition. It will be further appreciated that the R/O Scanning tasks may be performed in parallel with regular access to other data 408 partitions.

It will be further appreciated by one skilled in the art that the teachings herein are not limited to the specific Ceph or Hadoop® environments illustrated or discussed. It will be further appreciated other distributed storage technology may employ remotely accessible disks, whether Nonvolatile Memory Express over Fabrics or other disk or storage medium or media, and employ the present teachings to those technologies.

Figure 5:
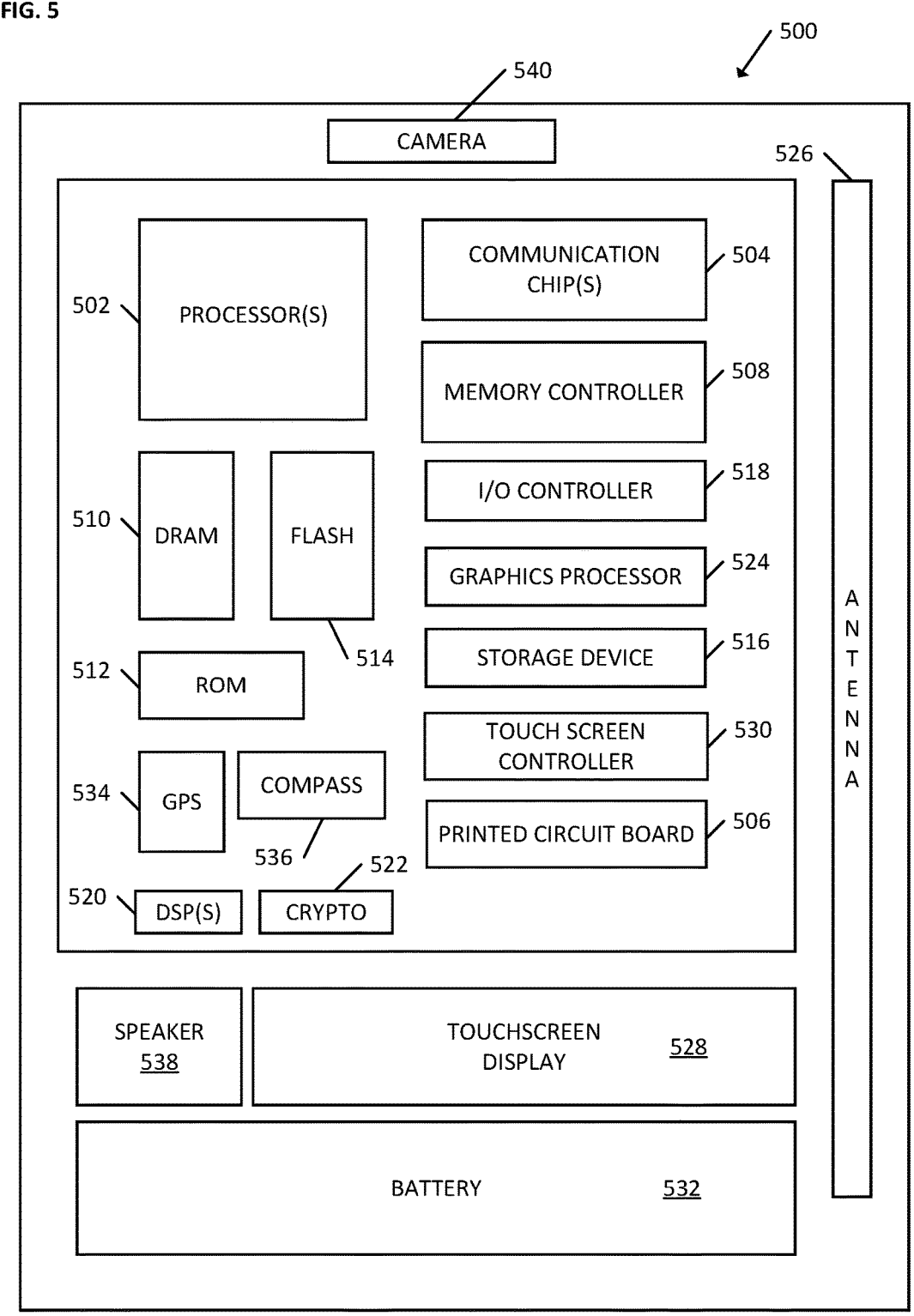
FIG. 5 illustrates an exemplary computer device that may employ the apparatuses and/or methods described herein.

FIG. 5 illustrates an example computer device 500 that may employ the apparatuses and/or methods described herein (e.g., for node 102, OSD 306, enclosure/machine 328, name node 414, target system 448), in accordance with various embodiments. As shown, computer device 500 may include a number of components, such as one or more processor(s) 502 (one shown) and at least one communication chip(s) 504. In various embodiments, the one or more processor(s) 502 each may include one or more processor cores. In various embodiments, the at least one communication chip 504 may be physically and electrically coupled to the one or more processor(s) 502. In further implementations, the communication chip(s) 504 may be part of the one or more processor(s) 502. In various embodiments, computer device 500 may include printed circuit board (PCB) 506. For these embodiments, the one or more processor(s) 502 and communication chip(s) 504 may be disposed thereon. In alternate embodiments, the various components may be coupled without the employment of PCB 506.

Depending on its applications, computer device 500 may include other components that may or may not be physically and electrically coupled to the PCB 506. These other components include, but are not limited to, memory controller 508, volatile memory (e.g., dynamic random access memory (DRAM) 510), non-volatile memory such as read only memory (ROM) 512, flash memory 514, storage device 516 (e.g., a hard-disk drive (HDD)), an I/O controller 518, a digital signal processor 520, a crypto processor 522, a graphics processor 524 (e.g., a graphics processing unit (GPU) or other circuitry for performing graphics), one or more antenna 526, a display which may be or work in conjunction with a touch screen display 528, a touch screen controller 530, a battery 532, an audio codec (not shown), a video codec (not shown), a positioning system such as a global positioning system (GPS) device 534 (it will be appreciated other location technology may be used), a compass 536, an accelerometer (not shown), a gyroscope (not shown), a speaker 538, a camera 540, and other mass storage devices (such as hard disk drive, a solid state drive, compact disk (CD), digital versatile disk (DVD)) (not shown), and so forth.

In some embodiments, the one or more processor(s) 502, flash memory 514, and/or storage device 516 may include associated firmware (not shown) storing programming instructions configured to enable computer device 500, in response to execution of the programming instructions by one or more processor(s) 502, to practice all or selected aspects of the methods described herein. In various embodiments, these aspects may additionally or alternatively be implemented using hardware separate from the one or more processor(s) 502, flash memory 514, or storage device 516. In one embodiment, memory, such as flash memory 514 or other memory in the computer device, is or may include a memory device that is a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product.

In various embodiments, one or more components of the computer device 500 may implement an embodiment of node 102, OSD 306, enclosure/machine 328, name node 414, target system 448, etc. Thus for example processor 502 could be the FIG. 3 CPU 330 or FIG. 4 CPU 460 communicating with memory 510 though memory controller 508. In some embodiments, I/O controller 518 may interface with one or more external devices to receive a data. Additionally, or alternatively, the external devices may be used to receive a data signal transmitted between components of the computer device 500.

The communication chip(s) 504 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip(s) may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device may include a plurality of communication chips 504. For instance, a first communication chip(s) may be dedicated to shorter range wireless communications such as Wi-Fi and Bluetooth, and a second communication chip 504 may be dedicated to longer range wireless communications such as GPS, EDGE, GPRS, CDMA, WiMAX, LTE, Ev-DO, and others.

The communication chip(s) may implement any number of standards, protocols, and/or technologies datacenters typically use, such as networking technology providing high-speed low latency communication. For example the communication chip(s) may support RoCE (Remote Direct Memory Access (RDMA) over Converged Ethernet), e.g., version 1 or 2, which is a routable protocol having efficient data transfers across a network, and is discussed for example at Internet URL RDMAconsortium.com. The chip(s) may support Fibre Channel over Ethernet (FCoE), iWARP, or other high-speed communication technology, see for example the OpenFabrics Enterprise Distribution (OFED™) documentation available at Internet URL OpenFabrics.org. It will be appreciated datacenter environments benefit from highly efficient networks, storage connectivity and scalability, e.g., Storage Area Networks (SANS), parallel computing using RDMA, Internet Wide Area Remote Protocol (iWARP), InfiniBand Architecture (IBA), and other such technology. Computer device 500 may support any of the infrastructures, protocols and technology identified here, and since new high-speed technology is always being implemented, it will be appreciated by one skilled in the art that the computer device is expected to support equivalents currently known or technology implemented in future.

In various implementations, the computer device 500 may be a laptop, a netbook, a notebook, an ultrabook, a smartphone, a computer tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder, or a transportation device (e.g., any motorized or manual device such as a bicycle, motorcycle, automobile, taxi, train, plane, etc.). In further implementations, the computer device 500 may be any other electronic device that processes data.

Figure 6:
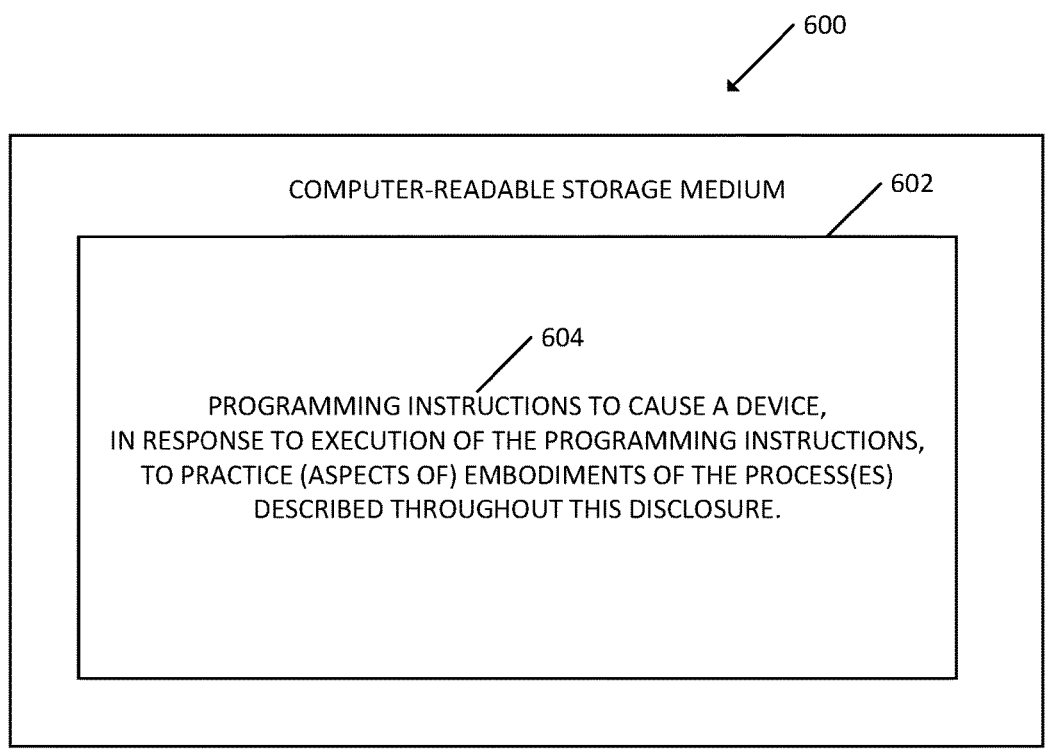
FIG. 6 illustrates an exemplary computer-readable non-transitory storage medium.

FIG. 6 illustrates an example computer-readable non-transitory storage medium that may be suitable for use to store instructions that cause an apparatus, in response to execution of the instructions by the apparatus, to practice selected aspects of the present disclosure. As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. As shown, non-transitory computer-readable storage medium 602 may include a number of programming instructions 604. Programming instructions 604 may be configured to enable a device, e.g., computer device 500, in response to execution of the programming instructions, to implement (aspects of) the sidecar technology disclosed herein. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Cooperative program execution may be for a fee based on a commercial transaction, such as a negotiated rate (offer/accept) arrangement, established and/or customary rates, and may include micropayments between device(s) cooperatively executing the program or storing and/or managing associated data.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Example 1 may be a system of nodes including a first host, a second host, and a remote target, the devices communicating at least in part over a link, the system comprising the remote target node including: a disk for storing an object corresponding to data, and a scrubber to perform a first validate the object, and to send a report of a potentially corrupted object; the first host including a first object manager to manage objects associated with the first host being stored on the remote target node; and the second host including a second object manager to manage objects associated with the second host being stored on the remote target node, the second object manager: to receive the report, to perform a second validate the object to confirm the object is corrupted, to obtain a corrected object from the first object manager, and to direct the remote target node to update the object with the corrected object.

Example 2 may be example 1 wherein the remote target is to identify a responsible host managing the potentially corrupted object and send the report thereto.

Example 3 may be example 1 or example 2 wherein the object contains at least a file that contains at least the data corresponding to the object.

Example 4 may be example 1 or examples 2-3, wherein the disk is presented over the link with a protocol compatible with NVM Express data over fabric (NVMe-oF) and the disk has a file system format compatible with a distributed filesystem.

Example 5 may be example 4, wherein the distributed filesystem is compatible with a selected one or more of: Hadoop®, Ceph, or a structured data layout.

Example 6 may be example 4, wherein the remote target has a multi-threaded scrubbing mode in which different objects are assigned to different threads for asynchronously scrubbing objects.

Example 7 may be example 1 or examples 2-6, wherein the scrubber is implemented in circuitry.

Example 8 may be a method for a node in a collective of nodes distributed across a fabric to store data for an object manager of a host in a collective of hosts distributed across the fabric, comprising mounting a nonvolatile disk storing data for hosts in the collective of hosts, the nonvolatile disk having a known format for data stored on the nonvolatile disk; scrubbing data on the nonvolatile disk by at least performing a direct-inspection of data on the nonvolatile disk and comparing the data to first validation meta-data associated with the data, the scrubbing tolerant of stale data; identifying a first object stored in the nonvolatile disk that may contain corrupted data; determining the object manager of the host is managing storage of the object on the node; sending an identification of the first object to the object manager; and responsive to the sending, receiving a second object to update the first object.

Example 9 may be example 8 wherein performing the scrubbing asynchronous to processing data access requests from the host.

Example 10 may be example 8, wherein determining the first object manager includes inspecting a catalog of hosts in the collective of hosts to determine which host is responsible for the first object.

Example 11 may be example 8 or examples 9-10, wherein the scrubbing is performed as a read-only operation.

Example 12 may be example 8 or examples 9-11, wherein the first object manager does not scrub objects.

Example 13 may be example 8 or examples 9-12, wherein the host is configured to lock the first object, perform a host-based validation of the first object, and if the object is corrupted, to obtain the second object from a second host storing a valid copy of the first object and instruct the remote target to replace the first object with the second object.

Example 14 may be a method for a first object manager to scrub all objects on a nonvolatile disk associated with a remote target without having to read all objects on the nonvolatile disk over a network communicatively coupling the first object manager, a second object manager, and the remote target, comprising receive a message from the remote target identifying a location on the nonvolatile disk of a first object that is potentially corrupted; instructing the remote target to set a lock on the first object; getting a copy of the first object over the network; invalidating the first object based at least in part on getting a current validation meta-data for first object, computing a new validation meta-data for the first object, and comparing the current validation meta-data and the new validation meta-data; requesting, based at least in part on the invalidating, a second object being a valid copy of the corrupted object from the second object manager; and instructing the remote target to update the first object with data from the second object and to unlock the first object.

Example 15 may be example 14, wherein the lock is to assist with preserving consistency of the first object.

Example 16 may be example 14 or example 15, wherein the non-volatile disk associated with the remote target stores a number of objects for the first object manager, and wherein the first object manager performs getting the copy for a fraction of the number of objects.

Example 17 may be example 16 or examples 14-16, wherein the fraction is less than 10% of the number of objects.

Example 18 may be example 14 or examples 14-17, wherein the network is a fabric and the remote target is a non-volatile memory target accessible over the fabric.

Example 19 may be example 14 or examples 14-18, wherein the network is a fabric, and the remote target is a Nonvolatile Memory Express over Fabrics (NVMe-oF) target implemented in a selected one of or combination of software and circuitry.

Example 20 may be one or more non-transitory computer-readable media having instructions to provide for a node having at least one processor to store data for an object manager of a host, in response to execution by the node, cause the node to mount a nonvolatile disk storing data for hosts in the collective of hosts, the nonvolatile disk having a known format for data stored on the nonvolatile disk; scrub data on the nonvolatile disk by at least performing a direct-inspection of data on the nonvolatile disk and comparing the data to first validation meta-data associated with the data, the scrubbing tolerant of stale data; identify first object stored in the nonvolatile disk that may contain corrupted data; determine the object manager of the host is managing storage of the object on the node; send an identification of the first object to the object manager; and responsive to the sending, receive a second object to update the first object.

Example 21 may be example 20 further comprising instructions to perform the scrubbing asynchronous to processing data access requests from the host.

Example 22 may be example 20 or example 21, wherein the instructions to determine the first object manager includes further instructions to inspect a catalog of hosts in the collective of hosts to determine which host is responsible for the first object.

Example 23 may be example 20 or examples 20-22, wherein the instructions to scrub includes further instructions to perform the scrub as a read-only operation.

Example 24 may be example 20 or examples 20-23, wherein the host is configured to lock the first object, perform a host-based validation of the first object, and if the object is corrupted, to obtain the second object from a second host storing a valid copy of the first object and instruct the remote target to replace the first object with the second object.

Example 25 may be one or more non-transitory computer-readable media having instructions to provide for a first object manager having at least one processor to scrub all objects on a nonvolatile disk associated with a remote target without having to read all objects on the nonvolatile disk over a network communicatively coupling the first object manager, a second object manager, in response to execution by the first object manager, cause the first object manager to receive a message from the remote target identifying a location on the nonvolatile disk of a first object that is potentially corrupted; instruct the remote target to set a lock on the first object; get a copy of the first object over the network; invalidate the first object based at least in part on get a current validation meta-data for first object, compute a new validation meta-data for the first object, and compare the current validation meta-data and the new validation meta-data; request, based at least in part on the invalidating, a second object being a valid copy of the corrupted object from the second object manager; and instruct the remote target to update the first object with data from the second object and to unlock the first object.

Example 26 may be example 25, wherein the non-volatile disk associated with the remote target stores a number of objects for the first object manager, and the instructions for the first object manager to get the copy include further instructions to get a fraction of the number of objects.

Example 27 may be example 25 or example 26, wherein the non-volatile disk associated with the remote target stores a number of objects for the first object manager, and the instructions for the first object manager to get the copy include further instructions to get less than 10% of the number of objects.

Example 28 may be example 25 or examples 26-27, wherein the instructions include further instructions to communicate, over the network being a fabric, with the remote target being a non-volatile memory target accessible over the fabric.

Example 29 may be example 25 or examples 26-28, wherein the instructions include further instructions to communicate, over the network being a fabric, with the remote target being a Nonvolatile Memory Express over Fabrics (NVMe-oF) target implemented in a selected one of or combination of software and circuitry.

Example 30 may be a system of nodes including a first host means, a second host means, and a remote target means, the devices communicating at least in part over a link, the system comprising the remote target means including a disk for storing an object corresponding to data, and a scrubber to perform a first validate the object, and to send a report of a potentially corrupted object; the first host means including a first object manager to manage objects associated with the first host being stored on the remote target node; and the second host means including a second object manager to manage objects associated with the second host being stored on the remote target node, the second object manager: to receive the report, to perform a second validate the object to confirm the object is corrupted, to obtain a corrected object from the first object manager, and to direct the remote target node to update the object with the corrected object.

Example 31 may be example 30, wherein the target node means is to identify a responsible host managing the potentially corrupted object and send the report thereto.

Example 32 may be example 30 or example 31, wherein the remote target means has means for a multi-threaded scrubbing mode in which different objects are assigned to different threads for asynchronously scrubbing objects.

Example 33 may be a method for a node in a collective of nodes distributed across a fabric to store data for an object manager of a host in a collective of hosts distributed across the fabric, comprising means for mounting a nonvolatile disk storing data for hosts in the collective of hosts, the nonvolatile disk having a known format for data stored on the nonvolatile disk; means for scrubbing data on the nonvolatile disk by at least performing a direct-inspection of data on the nonvolatile disk and comparing the data to first validation meta-data associated with the data, the scrubbing tolerant of stale data; means for identifying a first object stored in the nonvolatile disk that may contain corrupted data; means for determining the object manager of the host is managing storage of the object on the node; means for sending an identification of the first object to the object manager; and means for responsive to the sending, receiving a second object to update the first object.

Example 34 may be example 33, further comprising means for performing the scrubbing asynchronous to processing data access requests from the host.

Example 35 may be example 33 or example 34, wherein determining the first object manager includes means for inspecting a catalog of hosts in the collective of hosts to determine which host is responsible for the first object.

Example 36 may be example 33 or examples 34-35, wherein the host is configured with means to lock the first object, perform a host-based validation of the first object, and if the object is corrupted, to obtain the second object from a second host storing a valid copy of the first object and instruct the remote target to replace the first object with the second object.

Example 37 may be a method for a first object manager to scrub all objects on a nonvolatile disk associated with a remote target without having to read all objects on the nonvolatile disk over a network communicatively coupling the first object manager, a second object manager, and the remote target, comprising means for receiving a message from the remote target identifying a location on the nonvolatile disk of a first object that is potentially corrupted; means for instructing the remote target to set a lock on the first object; means for getting a copy of the first object over the network; means for invalidating the first object based at least in part on getting a current validation meta-data for first object, computing a new validation meta-data for the first object, and comparing the current validation meta-data and the new validation meta-data; means for requesting, based at least in part on the invalidating, a second object being a valid copy of the corrupted object from the second object manager; and means for instructing the remote target to update the first object with data from the second object and to unlock the first object.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A system of nodes including a first host, a second host, and a remote target, these devices communicating at least in part over a link, the system comprising:
   the remote target including:
      a disk for storing an object corresponding to data, and
      a scrubber to perform a first validate of the object, and to send a report of a potentially corrupted object;
   the first host including a first object manager to manage objects associated with the first host being stored on the remote target; and
   the second host including a second object manager to manage objects associated with the second host being stored on the remote target, the second object manager:
      to receive the report, to perform a second validate of the object to confirm the object is corrupted,
to obtain a corrected object from the first object manager, and
to direct the remote target to update the object with the corrected object;
wherein the remote target further has a multi-threaded scrubbing mode in which different objects are assigned to different threads for asynchronously scrubbing objects.

2. The system of claim 1, wherein the remote target is to identify a responsible host managing the potentially corrupted object and send the report thereto.

3. The system of claim 1, wherein the object contains at least a file that contains at least the data corresponding to the object.

4. The system of claim 1, wherein the disk is presented over the link with a protocol compatible with NVM Express data over fabric (NVMe-oF) and the disk has a filesystem format compatible with a distributed filesystem.

5. The system of claim 4, wherein the distributed filesystem is compatible with a selected one or more of: Ceph, or a structured data layout.

6. The system of claim 1, wherein the scrubber is implemented in circuitry.

7. A method for a node in a collective of nodes distributed across a fabric to store data for an object manager of a host in a collective of hosts distributed across the fabric, comprising:
mounting a nonvolatile disk storing data for hosts in the collective of hosts, the nonvolatile disk having a known format for data stored on the nonvolatile disk;
scrubbing data on the nonvolatile disk by at least performing a direct-inspection of data on the nonvolatile disk and comparing the data to first validation meta-data associated with the data, the scrubbing tolerant of stale data;
identifying a first object stored in the nonvolatile disk that may contain corrupted data;
determining the object manager of the host is managing storage of the first object on the node;
sending an identification of the first object to the object manager; and
responsive to the sending, receiving a second object to update the first object;
wherein the host is configured to lock the first object, perform a host-based validation of the first object, and if the first object is corrupted, to obtain the second object from a second host storing a valid copy of the first object and instruct a remote target storing the first object to replace the first object with the second object.

8. The method of claim 7, further comprising:
performing the scrubbing asynchronous to processing data access requests from the host.

9. The method of claim 7, wherein determining the object manager includes inspecting a catalog of hosts in the collective of hosts to determine which host is responsible for the first object.

10. The method of claim 7, wherein the scrubbing is performed as a read-only operation, and wherein the object manager does not scrub objects.

11. A method for a first object manager to scrub all objects on a nonvolatile disk associated with a remote target without having to read all objects on the nonvolatile disk over a network communicatively coupling the first object manager, a second object manager, and the remote target, comprising:
receiving a message from the remote target identifying a location on the nonvolatile disk of a first object that is potentially corrupted;
getting a copy of the first object over the network;
invalidating the first object based at least in part on
getting a current validation meta-data for the first object,
computing a new validation meta-data for the first object, and
comparing the current validation meta-data and the new validation meta-data;
requesting, based at least in part on the invalidating, a second object being a valid copy of the corrupted object from the second object manager; and
instructing the remote target to update the first object with data from the second object and to unlock the first object;
wherein the nonvolatile disk associated with the remote target stores a number of objects for the first object manager, and wherein the first object manager performs getting the copy for a fraction of the number of objects; and
the fraction is less than 10% of the number of objects.

12. The method of claim 11, wherein the network is a fabric and the remote target is a nonvolatile memory target accessible over the fabric.

13. The method of claim 11, wherein the network is a fabric, and the remote target is a Nonvolatile Memory Express over Fabrics (NVMe-oF) target implemented in a selected one of or combination of software and circuitry.

14. One or more non-transitory computer-readable media having instructions to provide for a node having at least one processor to store data for an object manager of a host, and in response to execution by the node, cause the node to:
mount a nonvolatile disk storing data for hosts in a collective of hosts, the nonvolatile disk having a known format for data stored on the nonvolatile disk;
scrub data on the nonvolatile disk by at least performing a direct-inspection of data on the nonvolatile disk and comparing the data to first validation meta-data associated with the data, the scrubbing tolerant of stale data;
identify a first object stored in the nonvolatile disk that may contain corrupted data;
determine the object manager of the host is managing storage of the first object on the node;
send an identification of the first object to the object manager; and
responsive to the sending, receive a second object to update the first object;
wherein the instructions to perform the scrub include further instructions to scrub asynchronous to processing data access requests from the host; and
wherein the instructions to determine the object manager include further instructions to inspect a catalog of hosts in the collective of hosts to determine which host is responsible for the first object.

15. The one or more computer-readable media of claim 14, further comprising:
wherein the instructions to scrub include further instructions to perform the scrub as a read-only operation; and
wherein the host is configured to lock the first object, perform a host-based validation of the first object, and if the first object is corrupted, to obtain the second object from a second host storing a valid copy of the first object and instruct a remote target to replace the first object with the second object.

16. One or more non-transitory computer-readable media having instructions to provide for a first object manager having at least one processor to scrub all objects on a nonvolatile disk associated with a remote target without having to read all objects on the nonvolatile disk over a network communicatively coupling the first object manager, and a second object manager, and in response to execution by the first object manager, cause the first object manager to:
- receive a message from the remote target identifying a location on the nonvolatile disk of a first object that is potentially corrupted;
- instruct the remote target to set a lock on the first object;
- get a copy of the first object over the network;
- invalidate the first object based at least in part on
  - get a current validation meta-data for the first object,
  - compute a new validation meta-data for the first object, and
  - compare the current validation meta-data and the new validation meta-data;
- request, based at least in part on the invalidating, a second object being a valid copy of the corrupted object from the second object manager; and
- instruct the remote target to update the first object with data from the second object and to unlock the first object.

17. The one or more computer-readable media of claim 16, wherein the nonvolatile disk associated with the remote target stores a number of objects for the first object manager, and the instructions for the first object manager to get the copy include further instructions to get a fraction of the number of objects.

18. The one or more computer-readable media of claim 17, wherein the nonvolatile disk associated with the remote target stores a number of objects for the first object manager, and the instructions for the first object manager to get the copy include further instructions to get less than 10% of the number of objects.

19. The one or more computer-readable media of claim 17, wherein the instructions include further instructions to communicate, over the network being a fabric, with the remote target being a nonvolatile memory target accessible over the fabric.

20. The one or more computer-readable media of claim 17, wherein the instructions include further instructions to communicate, over the network being a fabric, with the remote target being a Nonvolatile Memory Express over Fabrics (NVMe-oF) target implemented in a selected one of or combination of software and circuitry.

* * * * *